United States Patent [19]

Danon et al.

[11] 4,253,484
[45] Mar. 3, 1981

[54] VALVE OPERATOR

[75] Inventors: Joseph S. Danon, El Toro; Theodore E. Kwast, Mission Viejo, both of Calif.

[73] Assignee: The Singer Company, Stamford, Conn.

[21] Appl. No.: 61,161

[22] Filed: Jul. 26, 1979

[51] Int. Cl.³ .................................... F16K 31/365
[52] U.S. Cl. .................................. 137/269; 137/86; 137/489
[58] Field of Search .............. 137/489, 86, 85, 508, 137/269

[56] References Cited

U.S. PATENT DOCUMENTS

| | | | |
|---|---|---|---|
| 2,745,423 | 5/1956 | Grogan | 137/85 |
| 2,860,650 | 11/1958 | Schink | 137/85 |
| 4,083,375 | 4/1978 | Johnson | 137/489 |

*Primary Examiner*—Alan Cohan
*Attorney, Agent, or Firm*—David L. Davis; Robert E. Smith; Edward L. Bell

[57] ABSTRACT

A valve operator is connected to a pipeline valve to control the throughput flow therethrough. A plurality of chambers are formed in the housing including control, balancing, bleed and regulator chambers. A poppet valve and an orifice device are disposed in the bleed chamber to be independently shiftable therein to vary the discharge from the orifice device which is shifted responsive to the pressure in the control chamber, while the poppet valve is shifted responsive to the pressure in the regulator chamber. A reset valve is connected in a reset loop connected between the control and balancing chambers to produce a predetermined delay in balancing the pressure gradient therebetween.

The regulating chamber is formed in a regulator section of the housing to be detachably connected thereto so that a plurality of regulator sections can be formed each having a different operative pressure range so that the valve operator is selectively usable for example for high, medium and low pressure operation.

The reset valve is adjustable to permit the delay to be set as desired.

5 Claims, 9 Drawing Figures

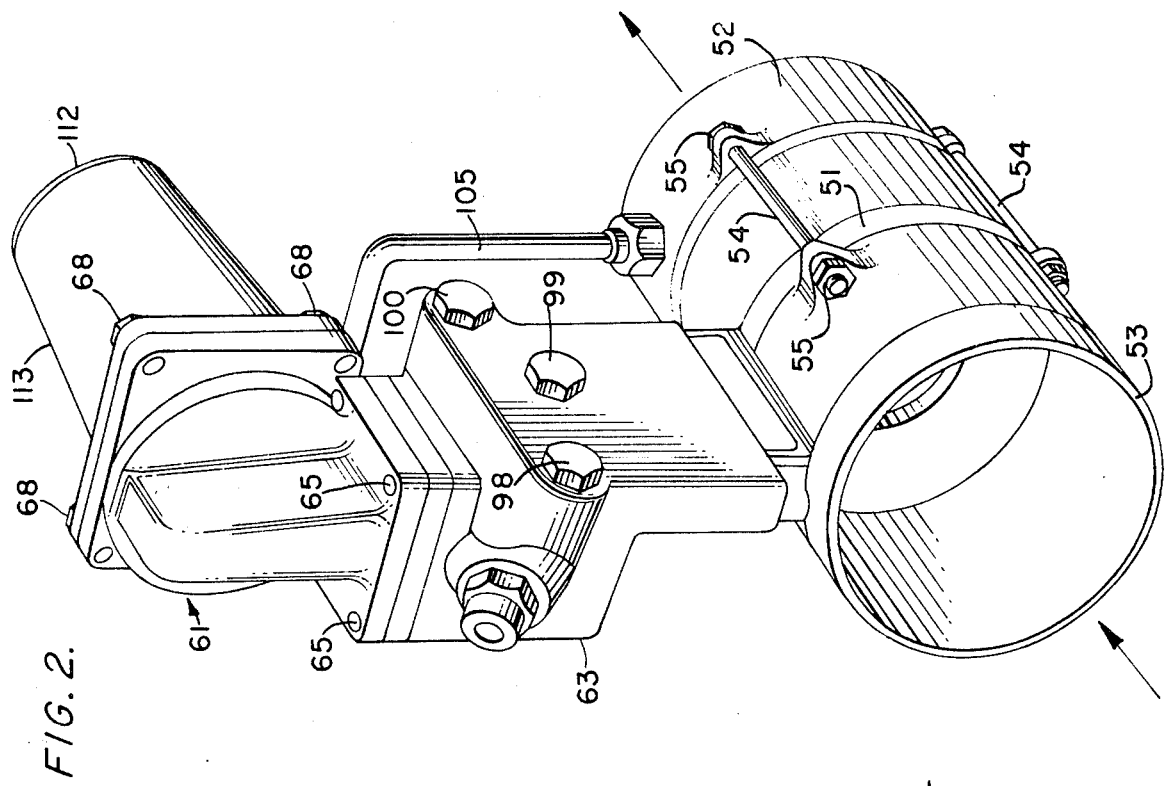
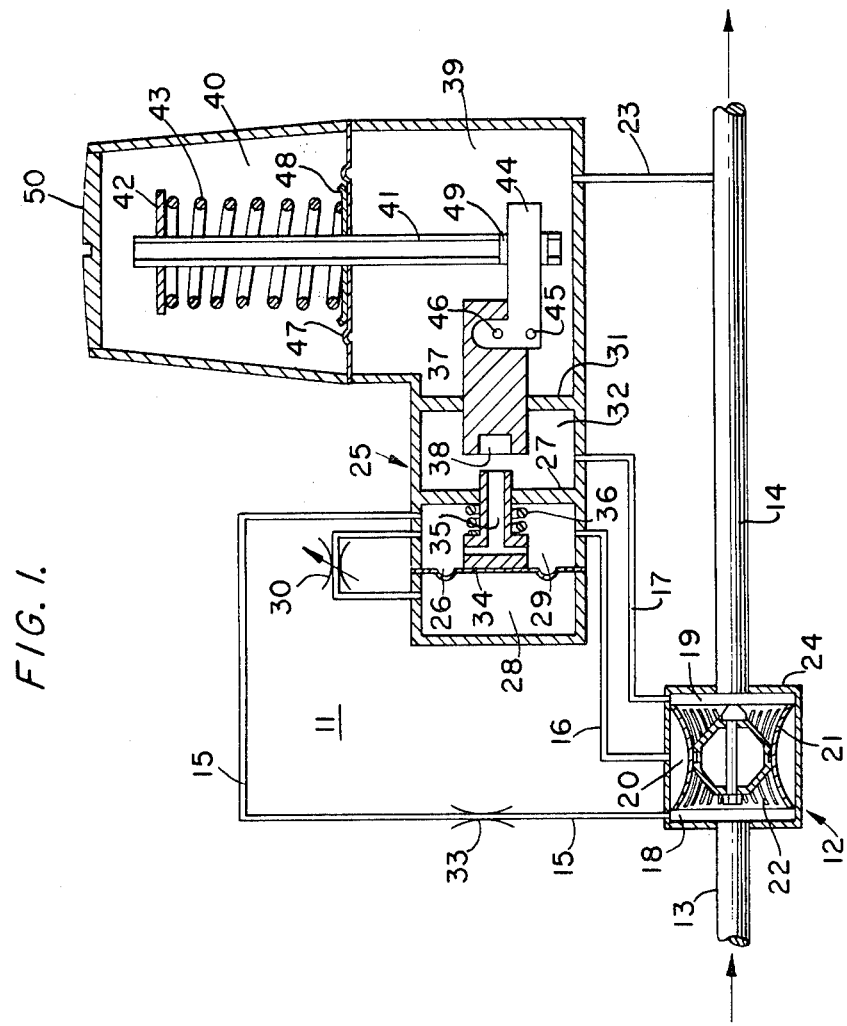

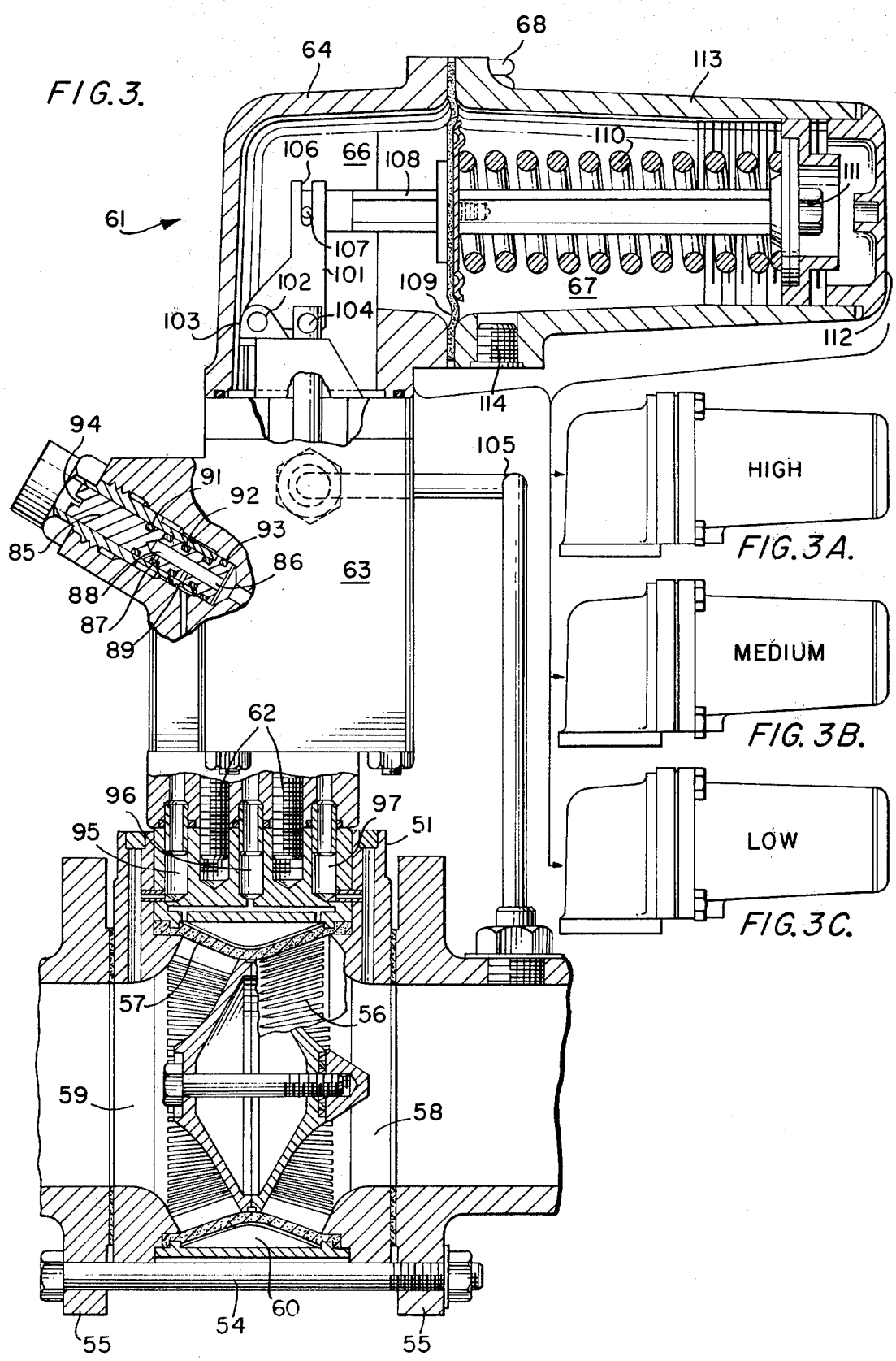

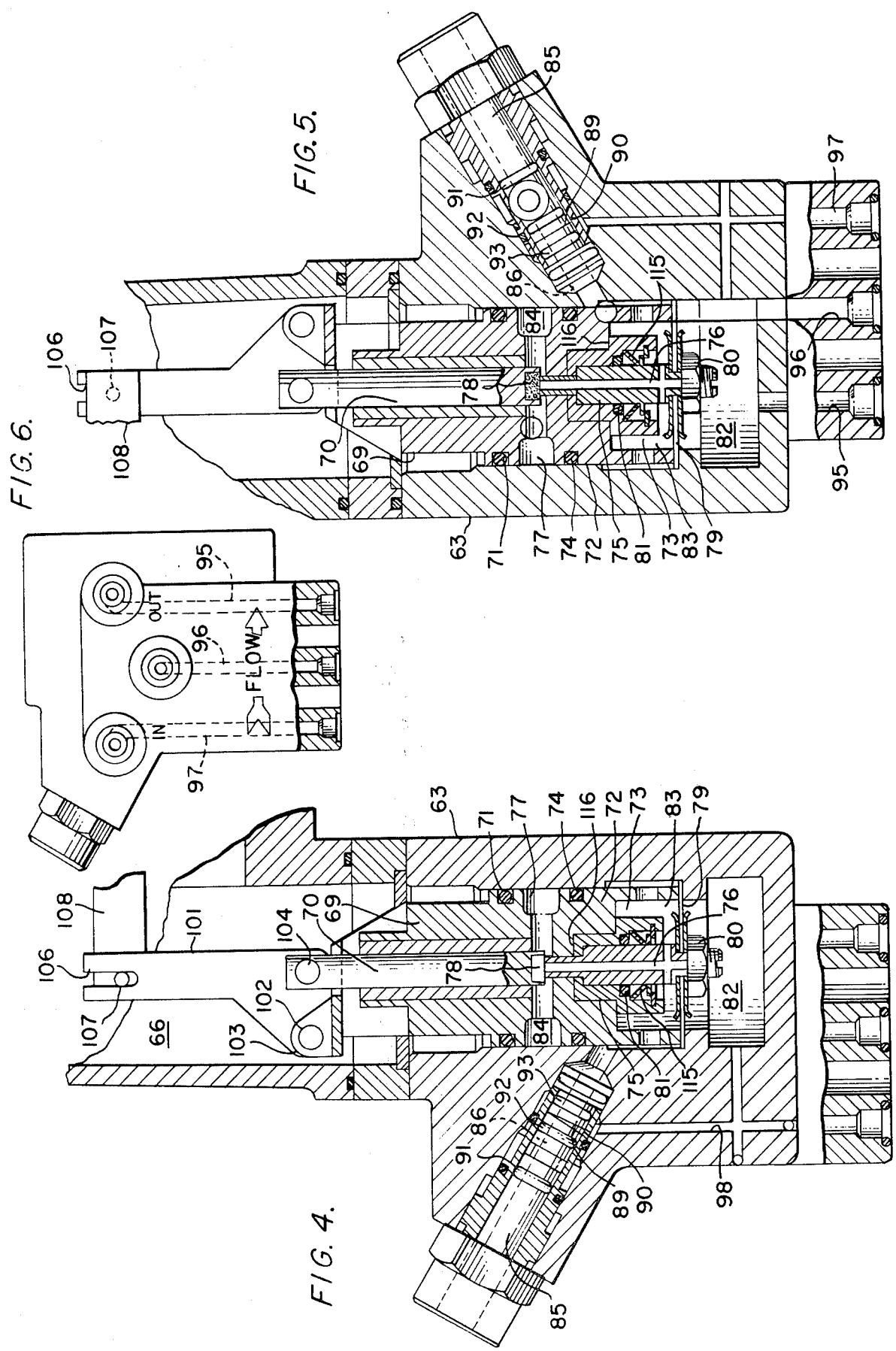

VALVE OPERATOR

DESCRIPTION

BACKGROUND OF THE INVENTION

Valve operators of the prior art were bulky, expensive, had poor performance, had limited pressure reduction range and operative pressure range, or were unstable in operation.

SUMMARY OF THE INVENTION

It is an object of the present invention to provide an improved valve operator which overcomes the prior art disadvantages; which is simple, economical, and reliable; which is compact; which has improved control pressure stability; which has a plurality of regulator sections only one of which is operatively connected to the housing to set the valve operator at the desired pressure range; which operator can be set for high (100 psig to 1000 psig), medium (5 psig to 100 psig) or low (5 wc to 5 psig) pressure operation and which operator has a reset valve to produce a predetermined delay in balancing the control pressure and to insure operative stability.

Other objects and advantages will be apparent from the following description of the invention and the novel features will be particularly pointed out hereinafter in the claims.

BRIEF DESCRIPTION OF THE DRAWINGS

This invention is illustrated in the accompanying drawings in which:

FIG. 1 is a diagrammatic representation of the valve operator of the present invention;

FIG. 2 is a perspective view of the improved valve operator of the present invention;

FIG. 3 is a side elevational view, partly in section, of the improved valve operator of the present invention, including the detachable pressure regulator section.

FIG. 3A shows a high pressure regulator section connectable to the valve operator of FIG. 3;

FIG. 3B shows a medium pressure regulator section connectable to the valve operator of FIG. 3;

FIG. 3C shows a low pressure regulator section connectable to the valve operator of FIG. 3;

FIG. 4 is an enlarged side elevational view, partly in section of the control housing, or manifold and reset valve (on the left side) shown in FIG. 3.

FIG. 5 is a mirror image of the FIG. 4 in that it is a side elevational view, partly in section showing the reset valve from the opposite side (right) and the control housing or manifold from the side shown in FIG. 1;

FIG. 6 is a view of the exterior of the reset valve as shown in FIG. 5 including the direction of flow.

DESCRIPTION OF THE INVENTION

The fundamentals of operation of multi-mode valve operators for controlling flow through a pipeline or conduit are described in "Fundamentals of Three-Mode Controllers" by Floyd D. Tury of the Fisher Controls Company of Marshalltown, Iowa, TM-28, copyrighted 1973, the contents of which are incorporated herein by reference. A specific proportional reset two mode valve operator, or regulator, is described in U.S. Pat. No. 4,083,375 the contents of which are incorporated herein by reference. The subject invention is also a proportional reset valve operator and is illustrated in FIG. 1 in simplified schematic and diagrammatic form and generally designated by the reference numeral 11. The valve operator 11, by way of conduits 15, 16, 17 and 23, is coupled to a main valve 12 for controlling the flow of a compressible fluid or gas through a pipeline which includes an upstream or inlet pipe 13 connected to a source of pressurized fluid (not shown) and a downstream or outlet pipe 14 connected to one or more pressurized fluid utilization devices (not shown). The valve 12 is controlled by the valve operator 11 to provide substantially constant downstream fluid pressure in the outlet pipe 14.

The valve 12 includes a housing structure 24 connected between the inlet pipe 13 and outlet pipe 14 and includes a valve inlet 18, a valve outlet 19 and a control chamber 20. Located between the valve 12 inlet 18 and outlet 19 is a slotted barrier 22 that provides an axial fluid flow path through the valve 12. Fluid flow through the valve 12 is controlled by the positioning of a flexible, resilient valve member or sleeve 21 that surrounds the slotted barrier 22. Positioning of the sleeve 21 between open (sleeve 21 is separated from the slotted barrier 22 by the maximum amount), closed (sleeve 21 presses against the slotted barrier 22 to prevent fluid flow therethrough) and intermediate throttling positions (sleeve 21 is separated from the slotted barrier 22 less than the maximum amount) is accomplished by the application of control pressure to the control chamber 20 from the valve operator 11 by way of the conduit 16. The type of valve 12 shown schematically in FIG. 1, and in more detail in FIG. 3, is described fully in U.S. Pat. No. 3,836,113 which is incorporated herein by reference. It is to be understood, however, that the valve operator 11 of this invention is not limited to use with the type of valve 12 described herein since the valve operator 11 can be utilized with various other types of pressure controlled valves to regulate the fluid pressure in a pipeline.

The valve operator 11 comprises a housing 25 having a plurality of chambers formed therein. A diaphram 26 and a first wall 27 within the housing 25 define a balancing chamber 28 and a control chamber 29 that are intercommunicated by way of a variable restrictor 30. The control chamber 29 receives valve 12 inlet pressure by way of the conduit 15 and a fixed restrictor 33 of fixed cross sectional area and provides control pressure to the control chamber 20 of the valve 12 by way of the conduit 16. A second wall 31 within the housing 25 forms a bleed chamber 32 between the first and second walls 27 and 31, respectively. Pressure is selectively bled or exhausted from the bleed chamber 32 by way of the conduit 17 to the valve 12 outlet 19, i.e. the downstream fluid flow. An orifice 34 is secured to the membrane 26 and is slidably mounted within the first wall 27 to protrude into the bleed chamber 32. A passageway 35 within the orifice 34 intercommunicates the valve operator 11 control 29 and bleed 32 chambers. A bias between the first wall 27 and the orifice 34 is provided by a spring 36. A poppet valve 37 is slidably mounted in the second wall 31 and has a valve seat 38 adjacent to the orifice 34 outlet.

Fluid flow through the valve operator 11 is from the valve 12 inlet, through the restrictor 33 and into the control chamber 29. From the control chamber 29 fluid flows into the balancing chamber 28 by way of the variable restrictor 30 until the pressure in the balancing chamber 28 is equal to the pressure in the control chamber 29. As long as the orifice 34 does not abut the valve seat 38 of the poppet valve 37, fluid flows from the control chamber 29 into the bleed chamber 32 and to the valve 12 outlet 19 by way of the conduit 17. This fluid flow causes the pressure within the control chamber 29 to be less than the valve 12 inlet pressure by an amount equal to the pressure drop across the fixed restrictor 33. This reduced pressure is communicated to the control chamber 20 of the valve 12 by way of conduit 16 to at least partially open the valve 12 to enable fluid flow therethrough. If the orifice abutted the valve seat 38 of the poppet valve 37, no fluid flow would exist between the control 29 and bleed 32 chambers and the presssure within the control chamber 29 would be equal to the inlet pressure at the valve 12 inlet 18. Under these conditions, the sleeve 21 is pressed against the slotted barrier 22 to close the valve 12. As will now be apparent, as the orifice 34 and poppet valve 37 move apart the fluid flow through the valve operator 11 increases thereby decreasing the pressure in the control chambers 29 and 20 to further open the valve 12. Conversely, as the orifice 34 and poppet valve 37 move closer together the fluid flow through the valve operator 11 decreases thereby increasing the pressure in the control chamber 29 and 20 to reduce the flow through the valve 12. The housing 25 further includes a regulator portion that includes a static chamber 39 and a reference chamber 40 which are separated by a diaphram 47. A rod 41 is secured to the diaphram 47 and has one end extending into the static chamber 39 and the other end extending into the reference chamber 40. The end of the rod 41 extending into the reference chamber 40 has an adjustable spring retaining member 42 thereon. A spring plate 48 surrounds the rod 41 on the reference chamber 40 side of the diaphram 47. A spring 43 is interposed between the spring retaining member 42 and the spring plate 48. The spring 43 exerts a pressure on the diaphram 47 that is equivalent to the pressure level at which the flow in the downstream pipe 14 is to be regulated. A removable portion 50 of the housing 25 surrounding the spring 43 permits adjustment of the spring retaining member 42 to adjust the force exerted by the spring on the diaphram 47. The spring 43 may be augmented or replaced by atmospheric or some other reference pressure.

The end of the rod 41 extending into the static chamber 39 has an opening 39 therein that surrounds one end of a bell crank 44 that is rotatable about pivot pin 45. The other end of the bell crank 44 is rotatably secured to the end of the poppet valve 37 which extends into the static chamber 39 by means of a pin 46. The static chamber 39 is convected to the downstream pipe 14 by way of the conduit 23.

When the pressure in the static chamber 39 is less than the pressure in the reference chamber 40, the rod 41 is moved downwardly by the diaphram 47 causing clockwise rotation of the bell crank 44 as shown in FIG. 1 which in turn causes the poppet valve 37 to move to the right away from the orifice 34. Conversely, when the pressure in the static chamber 39 is greater than the pressure in the reference chamber 40, the rod 41 is moved upwardly causing counterclockwise rotation of the bell crank 44 as shown in FIG. 1 which in turn causes the poppet valve 37 to move to the left toward the orifice 34. When the pressure in the control chamber 29 of the valve operator 11 is less than the pressure in the balancing chamber 28, the diaphram 26 will move the orifice 34 to the right toward the poppet valve 37 seat 38. However, as the pressure in the balancing chamber 28 and control chamber 29 begins to equalize by flow through the variable restrictor 30, the orifice 34 will begin to move back to its original position away from the poppet valve 37 seat 38.

In a steady state condition, the poppet valve 37 and orifice 34 are separated sufficiently so as to enable the control pressure in the control chamber 29 of the valve operator 11 to maintain the valve 12 in a throttling condition that produces a pressure in the downstream pipe 14 that is at the desired level established by the pressure in the reference chamber 40. This establishes a set point or null position of the valve operator 11 and the system is in equilibrium. Relatively slow pressure changes in the downstream pipe 14 due to a change in fluid demand by downstream fluid utilization devices causes the separation between the poppet valve 37 and the orifice 34 to change from the set point or null position to a final position that establishes a control pressure in the valve operator 11 control chamber 29 that enables the valve 12 to return the pressure in the downstream pipe to the desired level. For example, a decrease of downstream pressure causes the pressure within the static chamber 39 to also decrease. This results in the poppet valve 37 moving to the right thereby increasing its separation from the orifice 34 which decreases the control pressure to further open the valve 12. An increase of downstream pressure causes the pressure within the static chamber 39 to also increase. This results in the poppet moving to the left thereby decreasing its separation from the orifice 34 which increases the control pressure to move the valve 12 to a more closed position. Relatively slow pressure changes in the downstream pipe 14 do not produce a pressure differential between the operator valve 11 balance and control chambers 28 and 29, respectively, as do abrupt pressure changes in the downstream pipe 14. This is so because relatively slow pressure changes do not cause any significant delay in passing through the variable restrictor 30.

An abrupt or step in pressure in the downstream pipe 14 due to a change in fluid demand by downstream fluid utilization devices cause the separation between the poppet valve 37 and the orifice to change from the set point or null position to a final reset position that establishes a control pressure in the valve operator 11 control chamber 29 that enables the valve 12 to maintain the pressure in the downstream pipe 14 at the desired level. For example, if a step increase occurs in the load flow the downstream pressure decreases which reduces the pressure in the static chamber 39. This results in the poppet valve 37 moving to the right to abruptly decrease the pressure in the control chamber 29. Due to the variable restrictor 30, however, this pressure change does not immediately occur in the balancing chamber 28. The resultting pressure differential across the diaphram 26 moves the orifice 34 to the right toward the poppet valve 37 to limit the separation therebetween to momentarily maintain a high gain to provide good transient control. As the pressure between the balance chamber 28 and the control chamber 29 begins to equalize due to flow through the variable restrictor 30, the separation between the orifice 34 and the poppet valve 37 increases to reduce the gain. This gain reduction during the transient portion of the distrubance prevents the system from oscillating in an unstable manner. The resulting decrease of control pressure further opens the valve 12 to enable increased fluid flow into the downstream pipe 14. As the increased flow demands are met, the pressure across the diaphram 26 slowly reaches equilibrium, the pressure in the static chamber 39 increases, the orifice 34 slowly returns to its original position and the poppet valve moves to the left to a high gain position as before and the system is again stabilized.

If a step decrease occurs in the loadflow the downstream pressure increases which increases the pressure in the static chamber 39. This results in the poppet valve 37 moving to the left to abruptly increase the pressure in the control chamber 29. Due to the variable restrictor 30, however, this pressure change does not immediately occur in the balancing chamber 28. The resulting pressure differential across the diaphram 26 moves the orifice to the left to limit the separation between it and the poppet valve 37 to momentarily maintain a high gain to provide good transient control. As the pressure between the balance chamber 28 and the control chamber 29 begins to equalize due to flow through the variable restrictor 30, the separation between the orifice and the poppet valve 37 increases to reduce the gain. As the transient disturbance decays and the system approaches equilibrium, the pressure in the control chamber 29 slowly increases and cancels the gain cutting effect.

A detailed embodiment of the present invention is illustrated in FIGS. 2 through 6 as including a valve 51 that is coupled between an inlet or upstream pipe 53 and an outlet or downstream pipe 52 by any suitable means such as bolts 54 that engage flanged members 55. The valve 51 includes a slotted barrier member 56, an elastic sleeve 57, an inlet portion 58, an outlet portion 59 and a control chamber 60. The operation of the valve 51 is substantially identical to the valve 12 described in conjunction with FIG. 1.

A valve operator 61 is coupled to the valve 51 by means of a plurality of bolts 62 and includes a hollow manifold housing 63 and a hollow regulating housing 64 that is secured to the manifold housing 63 by bolts 65. The regulator housing 64 includes a static chamber 66 and a reference chamber portion 67 that is removable by means of bolts 68. The interior of the manifold housing 63 includes a valve guide member 69 that has a poppet valve member 70 slidably mounted therein. A pressure seal between the valve guide member 69 and the interior of the manifold housing 63 is provided by an O-ring 71. Located within the manifold housing 63 and spaced apart from the valve guide member 69 is an orifice housing 72 that includes an orifice nut 73 secured thereto. An O-ring 74 provides a pressure seal between the orifice housing 72 and the interior surface of the manifold housing 63. An orifice 75 having a passageway 76 therethrough is slidably mounted within the orifice nut 73. One end of the orifice 75 extends into the space 77 between the orifice housing 72 and the valve guide member 69 and is adjacent to a valve seat 78 in the poppet valve 70. The other end of the orifice 75 is secured to a diaphram 79 by means of a nut 80. An O-ring 81 provides a pressure seal between the orifice nut 73 and the orifice 75. The space below the diaphram 79 within the manifold housing 63 defines a balancing chamber 82 and the space around the orifice 75 and orifice nut 73 within the manifold housing 63 defines a control chamber 83 while the space between the valve guide member 69 and the orifice housing 72 defines a bleed chamber 84.

The manifold housing 63 includes a rotatable restrictor element 85 (best seen in FIG. 3) having a fixed restrictor portion and a variable restrictor portion and includes a passageway 86 along a portion of its longitudinal axis. The fixed restrictor portion includes a reduced diameter section 87. A hole 88 intercommunicates the reduced diameter section 87 with the passageway 86 and provides a fixed resistance to fluid flow.

The variable restrictor (seen in FIG. 4) section includes a variable width groove 89 that circumscribes the outer periphery of the restrictor element 85 and provides a variable resistance to fluid flow. A hole 90 intercommunicates the groove 89 with the passageway 86 within the restrictor element 85. The fixed and variable restrictor sections are pressure sealed by means of O-rings 91, 92 and 93 between the restrictor element 85 and the manifold housing 63.

The bleed chamber 84 is coupled to the outlet portion 59 of the valve 51 by a passageway 95. The control chamber 83 of the operator valve is coupled to the control chamber 60 of the valve 51 by a passageway 96. The control chamber 83 is also coupled to the inlet portion 58 of the valve 51 by a passageway 97 and the fixed restrictor portion of the restrictor element 85. The balancing chamber 82 is intercommunicated with the control chamber 83 of the operator valve by way of a passageway 98 and the variable restrictor portion of the restrictor element 85. The restrictor element 85 is rotatable within the manifold housing 63 by means of a screw driver engaging slot 94 in the end of the restrictor element 85. Rotation of the restrictor element 85 places a different portion of the variable width groove 89 in the path of fluid flow between the balancing and control chambers 82 and 83, respectively, thereby varying the resistance to fluid flow therebetween. Rotation of the restrictor element 85, however, does not change the resistance to fluid flow provided by the fixed restrictor portion of the restrictor element 85. Access to the passageways 95, 96 and 97 for various measuring and testing purposes is provided by removable bolts 98, 99 and 100 respectively.

The end of the poppet valve 70 remote from the orifice 75 extends into the static chamber 66 and is connected to a pivoted lever 101 by a rivet 104. The lever 101 is rotatable about a pin 102 secured to a static chamber 66 communicates with the downstream pipe 53 by way of a conduit 105. The lever 101 includes a slot 106 that engages a pin 107 on a rod 108 that is secured to a diaphram 109 that separates the static and reference chambers 66 and 67 respectively. The reference chamber 67 includes a spring 110 that establishes the desired reference pressure on the diaphram 109. A bolt 111 enables the pressure exerted by the spring 110 to be varied. Access to the bolt 110 is provided by a removable cap 112 on the reference chamber 67 housing 113. The reference chamber is vented to a reference pressure, such as atmospheric pressure by means of a screened a vent plug 114. By utilizing springs 110 of different stiffness, different ranges of reference pressures can be obtained. For example one spring was used to provide a low pressure reference chamber 67 (FIG. 3C) for pressures of 5 inches of water column to five psig, another spring to provide a reference chamber 67 for medium pressures (FIG. 3B) of five psig to one hundred psig and still another spring to provide a reference chamber 67 for high pressures (FIG. 3A) of one hundred psig to about one thousand psig.

In a manner as described hereinabove in conjunction with FIG. 1, a pressure differential across the diaphram 109 between the static and reference chambers 66 and 67, respectively, cause the lever 101 to pivot around the pin 102 to change the position of the poppet valve 70 with respect to the orifice 75 whereas a pressure differential across the diaphram 79 between the balancing and control chambers 82 and 83, respectively, cause a change of position of the orifice 75 with regard to the poppet valve 70 to compensate for changes in fluid flow requirements.

In many prior art valve operators, a variation in inlet pressure is accompanied by a proportional variation in outlet pressure. This is termed outlet pressure elevation and results in reduced capacity performance. To offset this feature, orifice 75 includes a wave spring 115 located in the path of travel of the orifice. The flanged end of the movable orifice 75 is exposed to the inlet pressure, and up to approximately five psig the orifice 75 remains in the retracted position. As the inlet pressure is increased, the orifice 75 moves thereby compressing the wave spring 115 until the orifice 75 contacts a stop 116 at approximately eight hundred psig. Conversely, as inlet pressure is reduced, the orifice 75 retracts. The amount, and direction, of stroke of the orifice is directly proportional to inlet pressure variation.

The effect to the other parts of the valve operator 61 is conducive to the movement of the orifice 75 in that as the orifice 75 moves the poppet valve 70 moves an equivalent amount through the lever piovted lever 101, and the diaphragm assembly 109. Therefore, as the orifice 75 moves due to an inlet pressure increase, the diaphragm 109 elevation is lowered, reducing the compression in the reference spring 110 which would be similar to backing off the adjusting bolt 111 and tending to reduce the control pressure in control chamber 83 for an increase in inlet pressure. The movements of the parts are naturally reversed for a decrease in inlet pressure. Accordingly, the effects of inlet pressure variations are minimized.

Other embodiments and modifications of the invention described herein will be apparent to those skilled in the art without departing from the spirit and scope of this invention as defined by the following claims.

I claim:

1. A valve operator to control the throughput flow of a pipeline valve comprising:
   (a) a housing operatively connected to the valve,
   (b) a pair of spaced walls in the housing defining an intermediate bleed chamber,
   (c) a control chamber formed on one side of one of the walls adjacent the bleed chamber,
   (d) a control loop communicating the inlet pressure to the valve with the control chamber to regulate the flow through the valve,
   (e) a control diaphragm mounted in the control chamber positionable responsive to the pressure therein,
   (f) an orifice device connected to and moveable responsive to the control diaphragm,
   (g) the orifice device extending through the said adjacent wall to meter pressure fluid into the bleed chamber,
   (h) a balancing chamber formed on one side of the control diaphragm remote from the said adjacent wall,
   (i) a reset loop communicating the control chamber and the balancing chamber,
   (j) a reset valve mounted in the reset loop to produce a predetermined delay in balancing the pressure gradient across the control diaphragm,
   (k) a regulating chamber formed on the side of the other wall remote from the control chamber,
   (l) a static pressure line communicating outlet pressure to the regulating chamber,
   (m) a regulating diaphragm disposed in the regulating chamber positionable responsive to the static outlet pressure,
   (n) a poppet valve connected to and moveable responsive to the regulator diaphragm, and
   (o) the poppet valve passing through the said other wall to extend into the bleed chamber wherein it will be shifted toward or away from the orifice device independently to vary the discharge thereof.

2. The combination claimed in claim 1 wherein:
   (a) a reset valve selectively adjustable to set the delay between the control chamber and the balancing chamber.

3. The combination claimed in claim 1 wherein:
   (a) the housing has a control section and a regulator section detachably connected to the control section;
   (b) the control chamber is formed in the control section and
   (c) the regulator chamber is formed in the regulator section.

4. The combination claimed in claim 3 wherein:
   (a) the regulator section is formed in a plurality of pressure ranges, with separate sections for each pressure range, and only one of such sections being connected to the control section to set the predetermined pressure range.

5. The combination claimed in claim 4 wherein:
   (a) the regulator section is formed in three pressure ranges of high pressure (100 psig to 1000 psig), medium pressure (5 psig to 100 psig) and low pressure (5" water column (wc) to 5 psig), and
   (b) one of the regulator sections is operatively connected to the control section to form an operator at the desired pressure range.

* * * * *